United States Patent [19]

Dilhac et al.

[11] Patent Number: 5,553,939
[45] Date of Patent: Sep. 10, 1996

[54] METHOD AND DEVICE FOR CALIBRATING AN OPTICAL PYROMETER AND ASSOCIATED REFERENCE WAFERS

[75] Inventors: Jean-Marie Dilhac, Toulouse; Christian Ganibal, Saint-Orens; Bernard Rousset, Toulouse, all of France

[73] Assignee: Commonaute Economique Europeenne (CEE), Luxembourg, Luxembourg

[21] Appl. No.: 140,157

[22] PCT Filed: May 4, 1992

[86] PCT No.: PCT/FR92/00406

§ 371 Date: Oct. 28, 1993

§ 102(e) Date: Oct. 28, 1993

[87] PCT Pub. No.: WO92/19943

PCT Pub. Date: Nov. 12, 1992

[30] Foreign Application Priority Data

May 2, 1991 [LU] Luxembourg ............... 87933

[51] Int. Cl.⁶ .................................................. G01K 15/00
[52] U.S. Cl. ............................. 374/1; 356/43; 374/2
[58] Field of Search ............... 374/1, 2; 250/252.1; 356/43

[56] References Cited

U.S. PATENT DOCUMENTS

| | | | |
|---|---|---|---|
| 4,475,823 | 10/1984 | Stone | 374/1 |
| 4,502,792 | 3/1985 | Hunsucker | 374/1 |
| 4,768,885 | 9/1988 | Maier | 374/1 |
| 4,854,727 | 8/1989 | Pecot et al. | 374/1 |
| 4,969,748 | 11/1990 | Crowley | 374/1 |
| 5,221,142 | 6/1993 | Snow | 374/2 |
| 5,265,957 | 11/1993 | Moslehi et al. | 374/1 |
| 5,326,170 | 7/1994 | Moslehi et al. | 374/2 |

FOREIGN PATENT DOCUMENTS 2593284  7/1987  France.

*Primary Examiner*—Diego F. F. Gutierrez
*Attorney, Agent, or Firm*—Harold H. Dutton, Jr.; W. Charles L. Jamison; Diane F. Liebman

[57] ABSTRACT

A method of calibrating an optical pyrometer comprising placing an oven, a wafer with a reference region on at least part of one of its faces, the reference region having an electromagnetic wave reflection discontinuity at a known temperature value, transmitting an electromagnetic wave in the direction of the reference region, measuring and recording the intensity of the wave reflected by the reference region, measuring and recording the temperature of the reference region by means of the optical pyrometer to be calibrated, increasing the temperature of the oven, determining the moment when a discontinuity in the reflection of the electromagnetic wave is observed, registering the temperature value measured by the pyrometer at this moment, comparing this measured temperature value with the known temperature value, and causing the temperature value measured by the pyrometer and the known temperature value to coincide.

15 Claims, 1 Drawing Sheet

METHOD AND DEVICE FOR CALIBRATING AN OPTICAL PYROMETER AND ASSOCIATED REFERENCE WAFERS

The present invention concerns a method and device for calibrating an optical pyrometer, and associated reference wafers. One of the applications of the present invention relates in particular to the calibration of pyrometers associated with ovens for the rapid heat treatment of semiconductor wafers of silicon, germanium, gallium arsenide, etc.

BACKGROUND AND OBJECTS OF THE INVENTION

It is usual, particularly in the aforesaid application, to measure the temperature prevailing inside an oven by means of an optical pyrometer. Such an instrument enables the temperature of a body (wafers to be treated) to be determined by analysing the radiation emitted by the latter without any physical contact with the body itself.

However, pyrometers are subject to loss of adjustment and/or drift particularly as a function of the number of measurements made. Up till now, in order to recalibrate such a pyrometer, a reference thermocouple was fixed to the upper face of a wafer placed in an oven and the pyrometer was recalibrated so that the readings given by the thermocouple and those given by the pyrometer coincide.

Such a calibration method has many drawbacks, the most significant of which is that it requires the installation of a thermocouple in the oven, with its electrical connections to the means for processing the signals. In the majority of applications, it is essential for the objects treated (the wafers) to be treated without any contamination and therefore without any handling. However, introducing the thermocouple into the treatment oven and passing the electrical connections through are contamination factors. Moreover, the thermocouple wires must be soldered to the wafer by means of soldering carried out with a material different from that of the wafer. Because of this, the temperature reading given by the thermocouple has an error inherent in the nature and form of the soldering. This error, which is difficult to predict, cannot be corrected in a reproducible manner.

The objective of the present invention is to mitigate all these drawbacks by providing a method and device for calibrating an optical pyrometer which do not require the introduction of any foreign bodies into the oven and allow in situ calibration of the pyrometer.

BRIEF DESCRIPTION OF THE INVENTION

To this end, the method according to the invention for calibrating an optical pyrometer consists of:

a) placing in an oven a wafer with a reference region on at least part of one of its faces, referred to as the active face, the reference region having electromagnetic wave reflection discontinuity at a known temperature, b) transmitting an electromagnetic wave in the direction of the reference region, c) measuring and recording the intensity of the wave reflected by the reference region, d) measuring and recording the temperature of the reference region, by means of the optical pyrometer to be calibrated, e) increasing the temperature of the oven, f) determining the moment when a discontinuity in the reflection of the electromagnetic wave is observed, g) registering the temperature value measured by the pyrometer at this moment, h) comparing this temperature value measured with the known temperature value, i) making the temperature value measured by the pyrometer and the known temperature value coincide.

Thus, by transmitting an electromagnetic wave, and particularly a laser wave, towards the reference region of the wafer, a radiation reflected by this reference region is created. Measuring and recording the intensity of this reflected radiation makes it possible to monitor the change in the reflection coefficient of the reference region during the period of the rise in temperature of the oven. At the same time, the pyrometer to be calibrated measures the temperature of the reference region. Determining the moment when a reflection discontinuity appears makes it possible to register the value of the temperature measured by the pyrometer at this moment. By comparing this temperature value measured and the known temperature value corresponding to the discontinuity observed, the correction to be made to the pyrometer to be calibrated is determined.

In this way a calibration is carried out, in situ, of the optical pyrometer associated with a given oven, without the introduction of any foreign body into the oven.

In a preferred method of implementing the method, a wafer is used on which the reference region consists of an active material having reflection discontinuity when it changes from the solid state to the liquid state. Preferably the known temperature is the melting point of this active material.

Preferably and in order to refine the measurement of the intensity of a reflected radiation, chromatic filtering is carried out prior to this measurement in order to eliminate therefrom any stray electromagnetic wave (originating from the heating elements in the oven, for example).

The present invention also concerns a device for calibrating an optical pyrometer associated with an oven for the purpose of giving an electrical temperature signal, characterised in that it comprises:

a wafer with a reference region having electromagnetic wave reflection discontinuity at a known temperature and suitable for being placed in the oven so that its reference region is on the axis of sight of the pyrometer to be calibrated, an electromagnetic wave transmitter suitable for transmitting an electromagnetic wave in the direction of the reference region of the wafer, an electromagnetic wave sensor arranged to receive the radiation reflected by the reference region and suitable for giving an electrical signal proportional to the intensity of this radiation, signal processing means, arranged to receive the electrical signals coming from the sensor and from the pyrometer to be calibrated and suitable for detecting the moment of appearance of a discontinuity in the signal coming from the sensor and to give a signal, referred to as the calibration temperature signal, representing the temperature signal coming from the pyrometer at this moment, means for comparing the calibration temperature signal and a reference signal representing the known temperature corresponding to the aforesaid reflection discontinuity, suitable for giving a correction signal representing the difference between these signals, and means for correcting the pyrometer arranged to receive the correction signal and suitable for applying this signal to means for calibrating the pyrometer in order to make the calibration temperature value and known temperature value coincide.

By virtue of these arrangements, on the one hand the sensor sends an electrical signal to the signal processing means, which enables the change in the reflection coefficient of the reference region to be monitored, and on the other hand and simultaneously, the pyrometer to be calibrated makes it possible to monitor the change in the temperature of the reference region and to send, to the signal processing means, the value of the temperature which it measures. When the signal processing means detect a reflection discontinuity, the so-called calibration temperature value measured at this moment by the pyrometer is registered. The comparison means, consisting for example of electronic memories, compare the calibration temperature value with a known temperature value and then determine the correction to be made to the pyrometer in order to make these two values coincide.

Calibration of the pyrometer is thus carried out, in situ, automatically and without putting any foreign body into the oven.

According to a preferred embodiment, the known temperature value is the melting point of an active material in the reference region.

The present invention also concerns a reference wafer for calibrating an optical pyrometer, characterised in that it has an active face, an inactive face and a thickness such that the active and inactive faces are substantially isothermal, and in that it has, on at least part of its active face, a reference region having a layer of active material with a reflection discontinuity at its melting point.

By virtue of such an arrangement, when the active material in the reference region is at its melting point, a reflection discontinuity is observed. As the melting point is known very precisely, the reflection discontinuity observed makes it possible to determine accurately the moment when this known temperature is reached. It is thus possible to calibrate an optical pyrometer associated with this wafer.

In a first embodiment, the reference region covers all the active surface of the wafer.

In a second embodiment, the reference region covers only part of the active surface, the remainder of which is intended to receive a normal treatment.

Preferably the active material is a pure crystalline body and the wafer consists of a plurality of thin layers of material.

Such a method, device and reference wafer enable a temperature measuring appliance to be calibrated in situ (in an oven) without causing any foreign bodies to enter the oven.

BRIEF DESCRIPTION OF THE DRAWINGS

Other objects, characteristics and advantages of the present invention will emerge from the following description, given by way of example, with reference to the accompanying drawings in which.

DESCRIPTION OF PREFERRED EMBODIMENTS

Figure 1:
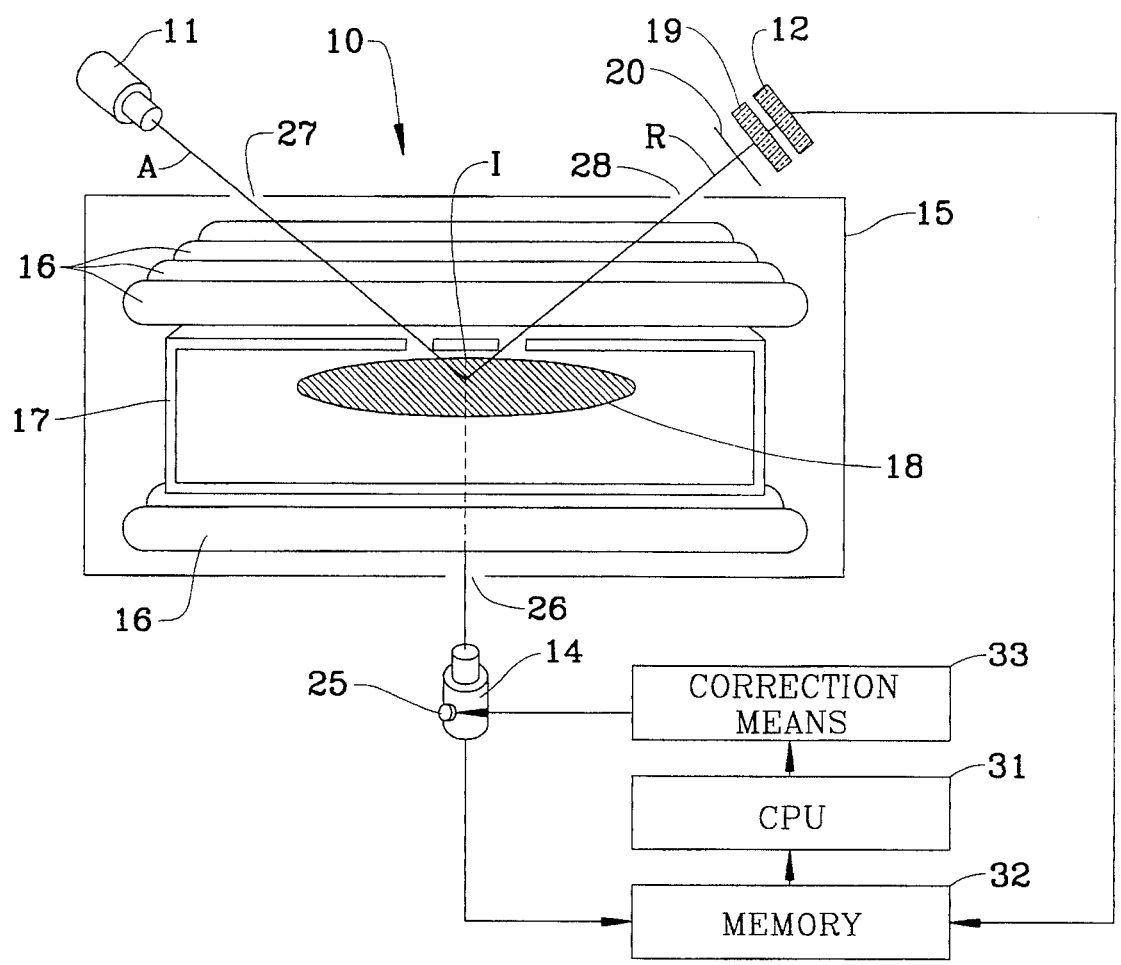
FIG. 1 is a diagrammatic view, partially in perspective, showing the device according to the invention.
Figure 2:
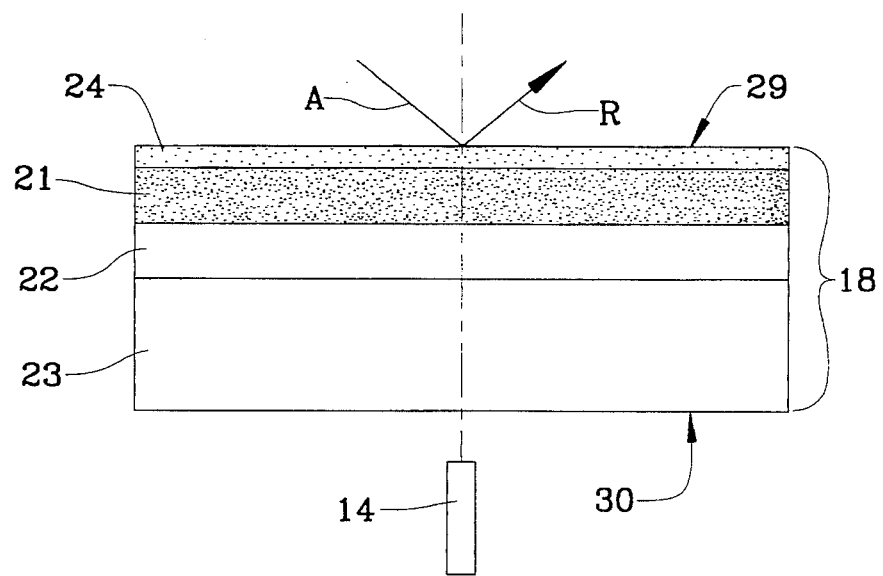
FIG. 2 is a diagrammatic view, in section and to an expanded scale, of a wafer according to the invention and an associated pyrometer.

According to the embodiment described and shown in FIGS. 1 and 2, the calibration device 10 according to the invention includes an electromagnetic wave transmitter 11, a sensor 12, signal processing means 32, comparison means 31, correction means 33 and a reference wafer 18. This device makes it possible to calibrate a pyrometer 14 associated with an oven 15 containing a plurality of heating elements 16 distributed on each side of a quartz cell 17.

The oven 15 is closed off by a door (not shown) giving access to the cell 17 and making it possible to place in the latter an element to be treated 18, referred to as a wafer.

This wafer 18 rests, though its lower face, referred to as the inactive face, on supports at isolated points (not shown). Its upper face, referred to as the active face, in the example consists entirely of a reference region comprising an active material. This active material has a reflection discontinuity at its melting point. (This wafer will be described in detail below).

The electromagnetic wave transmitter 11 is generally a laser device (for example of the type sold under the name "Spectra Physics 155").

The optical sensor 12 associated with this type of transmitter is, for example, a photodiode (of the type sold under the name "OCLY 110C"). This optical sensor is fitted with a chromatic filter 19 (for example an optical filter sold under the name "ORIEL" with a 1 nm passband centred on 0.6328 µm, and a diaphragm 20). The optical sensor is connected to the signal processing means 32, to which it supplies an electrical signal proportional to the intensity of the radiation which it receives.

The pyrometer 14 is provided with a calibration unit, in this case a control potentiometer 25. Such an optical pyrometer is of the type sold under the name "IRCON" or similar. This pyrometer is located outside the oven 15 opposite an opening 26 made in this oven and is aimed at the inactive face of the wafer. The pyrometer is connected to the signal processing means 32, to which it supplies a signal proportional to the temperature of the body at which it is aimed.

Openings 27 and 28 are also made in the oven (without however impairing the effective insulation of this oven) so that an incident ray A and reflected ray R can pass.

The signal processing means 32 are connected to the sensor and pyrometer and consist of a set of electronic memories.

The comparison means 31 are connected to the signal processing means 32 and consist of a central computing unit.

Finally the correction means 33 are connected to the comparison means 31 and supply a control signal to the calibration unit 25.

The device according to the invention functions as described below.

An incident laser beam A is transmitted by the transmitter 11 in the direction of the wafer 18, and more exactly in the direction of the reference region of this wafer. The incident beam A thus passes through the opening 27 in the oven and then contacts the wafer 18 at a region I. A reflected beam R is returned and, after passing through the opening 28 in the oven, is picked up through the filter 19 by the sensor 12. This sensor supplies, to the signal processing means 32, an electrical signal proportional to the intensity of the light which it picks up. This signal is therefore a function of the reflection coefficient of the reference region.

Simultaneously the pyrometer to be calibrated 14 measures the temperature of the wafer 18 by aiming at the inactive face of the wafer 18 underneath the region I. As will be explained later, the temperatures of the wafer 18 on its active face and on its inactive face are substantially the same.

When the door to the oven 15 is reclosed, the heating elements 16 are put in operation and the temperature inside the cell increases. When the temperature in the cell is such that it causes the melting of the active layer of the wafer 18, the intensity reflected by the reference region I changes significantly and instantaneously. The signal processing means then register the temperature measured by the pyrometer, referred to as the calibration temperature, at the moment when the reflection discontinuity was observed.

The comparison means 31 compare the calibration temperature value and the reference signal representing the known temperature ($t_c$) corresponding to the melting point of the active material. A correction signal representing the difference between these signals results from this comparison. This correction signal is supplied to the correction means 33, which send a control signal to the calibration unit 25 of the pyrometer. Thus the calibration temperature value now corresponds to the known melting point ($t_c$).

The pyrometer is then correctly calibrated. It should be noted that the device described above may be provided with a transmitter, sensor, etc other than those whose commercial names are given. These names have been given only for information, for clarity of the present description.

It should be noted that the laser device used may be a continuous laser or a pulsed laser associated with synchronous detection.

When a continuous laser is used, the associated sensor 11 is provided with a diaphragm 20 for eliminating any stray electromagnetic waves.

As a variant, it is possible to replace the signal processing means 32, comparison means 31 and correction means 33 with a plotter and operator. In this case, the signal processing means consist of the plotter. This plotter prints the curves for the intensity of the reflected radiation against time and for temperature against time. The operator is substituted for the comparison means 31 and correction means 33. When the curve for the reflected radiation intensity shows an abrupt variation, the moment where this variation is observed is recorded. The operator then reads, on the measured temperature curve, the value of the calibration temperature measured at that moment. The operator compares this calibration temperature value with the known one ($t_c$) corresponding to the melting point of the active material in the reference region. He thus determines the difference between the calibration temperature and the known temperature. He then acts on the calibration potentiometer 25 to reduce this difference to zero.

The pyrometer is then correctly calibrated.

As stated earlier, the wafer 18 has a reference region. This wafer is preferably made up as described below. The wafer 18 is in the general shape of a disc. It is formed by a plurality of materials deposited in the form of thin layers and has an active face 29 and an inactive face 30. From the active face towards the inactive face there are respectively a protective layer 24, an active layer 21, a separation layer 22 and a support layer 23.

The protective layer 24 may optionally be omitted. The melting point of this protective layer is higher than the melting point of the active layer.

The active layer 21 consists of a pure crystalline body having a reflection discontinuity at its melting point. The separation layer is intended to prevent the active layer and support layer mixing when the active layer is melting. This separation layer has good thermal conductivity.

It is very important for the melting point of the active layer to be lower than the melting point of the layers surrounding it (that is of the separation and protective layers, and of the support layer). To achieve this, the protective layer 24 is based on silicon nitride ($Si_3N_4$) generally deposited chemically in the vapour phase, the active layer is based on germanium (Ge), the separation layer is based on silicon dioxide ($SiO_2$) and the support layer is based on silicon (Si).

The materials mentioned above are only example embodiments. Many other materials could be used in so far as they meet the requirements laid down and set out above.

The fact that the active layer 21 consists of a pure crystalline body means that its melting point is known with very great accuracy. Because of this, the calibration of the pyrometer can be carried out with an accuracy of approximately or less than one degree. It should be noted that the protective layer 24 may be omitted. In this case, however, there is a risk that the melting active material may be deposited on the quartz cell 17 of the oven 15. For some applications it will be understood that such a deposition is not a handicap.

It should be emphasized that, because the wafer is produced in the form of thin layers of material, its thickness is minimal.

Preferably, on a very thin layer of silicon of around 250 μm, the silicon dioxide separation layer has a thickness of 5000 Å, the active layer of germanium also has a thickness of 5000 Å and the protective layer of silicon nitride is approximately 1000 Å. The total thickness of the wafer is therefore approximately 250 μm and may be less.

Given the good thermal conductivity of all the materials making up the wafer and their deposition in the form of thin layers, a wafer is obtained which is in thermal equilibrium in the vertical direction. It can thus be considered that the region where the laser beam impacts on the active face of the wafer and the region aimed at by the pyrometer situated on the inactive face underneath the laser beam impact region constitute two substantially isothermal surfaces.

Such a wafer on which the active face consists entirely of a reference region is intended to be placed regularly in the oven by means of the robot which puts the wafers in this oven, in order to calibrate the pyrometer associated with this oven. The same wafer may be reused at least ten times.

It is therefore easy to provide for an automatic calibration cycle every n wafers. As a variant, the wafer is provided, on its active face, with a reference region occupying only part of its face. In such case, the remainder of the active face is free to receive any appropriate treatment. The advantage of such a wafer is that calibration of the pyrometer may be carried out on each wafer or on some of them without having to place any special wafer in the oven. In fact, it is the conventional wafer to be treated which has a reference region on its active face but outside the treatment region.

Whatever the type of wafer used, it should be noted that no foreign body is introduced into the oven during the calibration of the pyrometer. No contamination (dust) is thus introduced. Moreover, the measurement of the reference temperature, carried out by detecting a reflection discontinuity, does not require any contact (soldering) with the wafer.

Naturally, the present invention is not limited to the different embodiments described and includes any variant within the capability of a person skilled in the art. Thus the shape and dimensions of the reference wafer may be different. The electromagnetic wave beam used may be of any kind. The active material is not necessarily germanium. Likewise, the oven associated with the pyrometer may very well not be a rapid heat treatment oven but quite simply a conventional oven.

We claim:

1. A method of calibrating an optical pyrometer comprising:

a) placing in an oven a wafer having a reference region on at least part of one of its faces, referred to as the active face, the reference region having an electromagnetic wave reflection discontinuity at a known temperature value, b) transmitting an electromagnetic wave in the direction of the reference region, c) measuring and recording the intensity of the wave reflected by the reference region, d) measuring and recording the temperature of the reference region by means of the optical pyrometer to be calibrated, e) increasing the temperature of the oven, f) determining the moment when a discontinuity in the reflection of the electromagnetic wave is observed, g) registering the temperature value measured by the pyrometer at this moment as a measured temperature value, h) comparing the measured temperature value with the known temperature value, i) causing the measured temperature value and the known temperature value coincide.

2. A method according to claim 1, wherein the reference region comprises an active material having a reflection discontinuity upon changing from the solid state to the liquid state, and in that the known temperature value is the melting point of this active material.

3. A method according to claim 2 and including chromatically filtering the reflected electromagnetic wave before measuring its intensity in order to eliminate any stray electromagnetic waves which do not originate from the reflection of the electromagnetic wave transmitted towards the reference region.

4. A method according to claim 1 and including placing the optical pyrometer to be calibrated so that it is aimed at the face opposite to the active face of the wafer in a region situated directly underneath the reference region.

5. A method according to claim 1, and wherein the reference region of said wafer completely covers the active face.

6. A method according to claim 1, and wherein the reference region of said wafer occupies only a part of the active face.

7. A device for calibrating an optical pyrometer including an oven for giving an electrical temperature signal, comprising:

a wafer (18) having a reference region having an electromagnetic wave reflection discontinuity at a known temperature value ($t_c$) and suitable for placement in said oven so that its reference region is on the axis of sight of the pyrometer to be calibrated, an electromagnetic wave transmitter (11) for transmitting an electromagnetic wave in the direction of the reference region of the wafer, an electromagnetic wave sensor (12) arranged for receiving the radiation reflected by the reference region and suitable for giving an electrical signal proportional to the intensity of this reflected radiation, signal processing means, for receiving electrical signals from said electromagnetic wave sensor and from said pyrometer to be calibrated for detecting the moment of appearance of a discontinuity in the signal from said electromagnetic wave sensor and for generating a calibration temperature signal, representing the calibration temperature value measured by said pyrometer at this moment, means for comparing the calibration temperature signal and a reference signal representing the known temperature value ($t_c$) corresponding to said reflection discontinuity for generating a correction signal representing the difference between said signals, and means for correcting the pyrometer and for receiving the correction signal and for applying said correction signal to said pyrometer and thereby causing the calibration temperature value and known temperature value ($t_c$) to coincide.

8. A device according to claim 7, and wherein said pyrometer to be calibrated is arranged opposite the face of the wafer having said reference region, and aimed at a region located underneath the reference region.

9. A device according to claim 7, and wherein said reference region comprises an active material having a reflection discontinuity when changing from the solid state to the liquid state and wherein said known temperature value ($t_c$) is the melting point of the active material.

10. Device according to claim 7, characterised in that the transmitter (11) is a pulsed or continuous laser.

11. Device according to claim 7, characterised in that the sensor (12) has a chromatic filter (19), suitable for eliminating from the reflected electromagnetic wave any stray waves which do not originate from the transmitter (11) by reflection on the reference region.

12. A device according claim 7, and wherein said signal processing means comprises electronic memories, and the comparison means comprises a central processing unit.

13. A device according to claim 7, and wherein said signal processing means comprises a plotter.

14. A device according to claim 7, and wherein said reference region completely covers one of the faces of the wafer (18).

15. A device according to claim 7, and wherein said reference region completely covers only a part of one of the faces of the wafer (18).

* * * * *